United States Patent [19]
Edgar et al.

[11] Patent Number: 5,750,677
[45] Date of Patent: May 12, 1998

[54] DIRECT PROCESS FOR THE PRODUCTION OF CELLULOSE ESTERS

[75] Inventors: Kevin J. Edgar; Richard T. Bogan, both of Kingsport, Tenn.

[73] Assignee: Eastman Chemical Company, Kingsport, Tenn.

[21] Appl. No.: 367,025

[22] Filed: Dec. 30, 1994

[51] Int. Cl.$^6$ ............... C08B 1/00; C08B 3/06; C08B 3/02
[52] U.S. Cl. ............... 536/63; 536/64; 536/65; 536/69; 536/70
[58] Field of Search ............... 536/58, 63, 64, 536/65, 69, 70

[56] References Cited

U.S. PATENT DOCUMENTS

| 1,880,808 | 10/1932 | Clarke et al. |
| 2,705,710 | 4/1955 | Blume . |
| 2,976,277 | 3/1961 | Touey et al. |
| 5,214,137 | 5/1993 | Wilson ............... 536/76 |

OTHER PUBLICATIONS

Malm, et al., *Ind. Eng. Chem.*, 1951, 43, 684–688.
*Carbohydrate Polymers*, 1993, 22, 1–7.
*Ind. Eng. Chem.*, 1951, 43, 684–691.
*Ind. Eng. Chem. Res.*, 1991, 31, 2647–2651.

*Primary Examiner*—Jeffrey Mullis
*Attorney, Agent, or Firm*—Betty J. Boshears; Harry J. Gwinnell

[57] ABSTRACT

The present invention relates to a process for preparing cellulose esters having a total DS/AGU of 0.1 to 3.0, said process comprising contacting the following:

(i) a cellulose material,
(ii) a solubilizing amount of a solvent system comprising a carboxamide diluent or a urea-based diluent,
(iii) an acylating reagent, and
(iv) a titanium-containing compound.

57 Claims, No Drawings

DIRECT PROCESS FOR THE PRODUCTION OF CELLULOSE ESTERS

FIELD OF THE INVENTION

This invention relates to a process for the preparation of esters of cellulose having a DS/AGU of between 0.1 and 3.0 where the cellulose or cellulose derivative is contacted with an acylating reagent, a titanium-containing compound, and a carboxamide diluent or a urea-based diluent.

BACKGROUND OF THE INVENTION

Cellulose esters (CEs) are conventionally synthesized by the reaction of cellulose with the anhydride or anhydrides corresponding to the desired ester group or groups, using the corresponding carboxylic acid as diluent and product solvent.

In these processes, the reaction mixture is heterogeneous initially due to the insolubility of cellulose in most organic solvents including carboxylic acids. The reaction is terminated when the cellulose derivative has gone into solution and the desired solution viscosity has been reached. When the mixture becomes homogeneous, the cellulose is fully or almost fully acylated.

Optionally, one may use a large excess of sulfuric acid catalyst, in which case the product is a cellulose alkanoate sulfate. Selective cleavage of the sulfate groups can afford a partially substituted cellulose alkanoate. It is, however, extremely difficult to remove a large DS (degree of substitution) of sulfate esters without simultaneously reducing the DP (degree of polymerization) of the cellulose ester to unacceptable levels.

Thus, in conventional processes, the synthesis of partially substituted cellulose esters is accomplished by hydrolysis of cellulose triesters, prepared by mineral acid catalyzed acylation in a separate step, to the desired level of substitution. Typically, hydrolysis in a mixture of water and carboxylic acid solvent results in scrambling of position of substitution (due to acyl migration and simultaneous, but slower, reesterification of the newly exposed hydroxyl groups by the carboxylic acid solvent) so that the products have an equilibrium distribution of ester substituents.

Partially substituted cellulose esters have great commercial value. They are used in coatings, where their greater solubility (in comparison with triesters) and hydroxyl group content (to facilitate crosslinking) are prized. In plastics, fibers, and film applications, the ability to synthesize partially substituted CEs permits control over thermal, mechanical, biodegradation, and compatibility properties.

It is well known in the art that esters of cellulose with long-chain carboxylic acids could be prepared by acylation with the corresponding acid chlorides in pyridine or, less successfully, other solvents. This method was useful only for synthesis of cellulose triesters. For example, see Malm, et al., *Ind. Eng. Chem.*, 1951, 43, 684–688.

U.S. Pat. No. 2,705,710 discloses DMAC as a solvent and sulfuric acid as a catalyst to make cellulose triacetate (a fully substituted ester —2.9 DS Ac and 0.10 DS sulfate). The reaction disclosed in this patent is run at 140° C. and is therefore, very fast. The disadvantage of the sulfuric acid technology of U.S. Pat. No. 2,705,710 is the need for a hydrolysis step in order to obtain partially substituted ester.

The use of titanate ester catalysts in carboxylic acid solvents is known in the literature. In U.S. Pat. No. 2,976,277, it is disclosed that titanate esters are efficient catalysts for the acylation of cellulose with anhydrides such as acetic, propionic, butyric, or mixtures thereof, in a diluent (and solvent for the product). The diluent was the carboxylic acid corresponding to the anhydride or to one of the anhydrides in the case of mixed esters, or an amide such as N,N-dimethylformamide. This process afforded acetone-soluble cellulose esters, of high IV (2.0–3.0). Also, large excesses of the anhydrides were used (6–27 equivalents based on anhydroglucose).

Direct synthesis of partially substituted CEs has also been taught previously by acylation of cellulose in solution as shown in U.S. Pat. No. 2,976,277. If cellulose is first dissolved in a mixture of lithium chloride and an amide solvent (either 1-methyl-2-pyrrolidinone (NMP) or N,N-dimethylacetamide (DMAC)), it can then be acylated with a carboxylic anhydride in the presence or absence of a catalyst to afford a partially or fully substituted CE depending only on the equivalents of anhydride added. Esters of cellulose with long-chain carboxylic acids have been made in this way. Thus, in Carbohydrate Polymers, 22, 1–7, 1993, it is disclosed that it is possible to react cellulose in DMAC/LiCl solution with a variety of carboxylic acid chlorides using amine catalysis, or alternatively carboxylic acids using dicyclohexylcarbodiimide catalysis, to obtain esters of cellulose with acids of chain length up to 18 carbons (stearate) and DS 0.1 to 2.5. While this method has great flexibility in terms of the nature of the anhydride and the DS of the product obtained, the necessity for dissolving cellulose means that reaction mixtures must be dilute (no more than 5% cellulose) and that the process is lengthened by the time it takes for cellulose dissolution. It is a practical necessity to develop a method to recycle the expensive lithium chloride with high efficiency, which method has not yet been disclosed.

Long-chain (carbon chain length greater than 4) esters of cellulose (LCCEs) are known from the pioneering work of Malm as shown in *Ind. Eng. Chem.*, 43, 684–691, 1951. Efforts to obtain LCCEs by reaction of cellulose with long-chain anhydrides in carboxylic acid solvent with mineral acid catalysis have not been successful because the esterification rate is too slow and cannot compete with the rate of chain cleavage.

The only other methods known in the literature involve the use of "impeller" reagents such as chloroacetic anhydride, as disclosed in U.S. Pat. No. 1,880,808, and the reaction of regenerated cellulose with long-chain acid chlorides in pyridine or, as disclosed in *Ind. Eng. Chem. Res.*, 31, 2647–2651, 1991, neat. The impeller reagents tend to be expensive, toxic, and difficult to handle.

Regenerated cellulose is expensive, as are acid chlorides, which also require reactors of corrosion-resistant construction. Additionally, direct reaction of cellulose with acid chlorides under vacuum does not result in homogeneous, soluble products.

LCCEs are of interest commercially because of their lower processing temperatures, greater impact strength, greater solubility in less polar solvents, the likelihood of greater compatibility with hydrophobic polymers, the potential for formation into molded or extruded objects without the need for a plasticizer, and their potential utility as associative thickeners for water-based paints (by analogy with long-chain ethers of cellulose, such as hydrophobically-modified hydroxyethylcellulose).

It has been also disclosed in U.S. Pat. No. 2,705,710 that activation of cellulose with N,N-dialkylamides prior to conventional (mineral acid and carboxylic anhydride) esterification permits rapid esterification without excessive degradation. The patent also discloses that this is a process for making cellulose triacetate with inherent viscosity in the range of 1.1 to 1.3 (less than that required for many current commercial applications).

Clearly, a need exists in the art for a process by which CEs of less than full substitution can be prepared directly from cellulose. The process must be economical, practical, and amenable to industrial production. It should be possible with this process to synthesize products which have sufficiently high molecular weight for their particular commercial application. It would be desirable to be able to use long-chain anhydrides in this process, such that cellulose esters containing long-chain ester groups could be obtained. It is essential that the products be sufficiently homogeneous so that they can be processed thermally and/or in solution, to be useful for film, coatings, plastics, and certain other applications. It is desirable to use a catalyst whose residues would not adversely effect the utility of the cellulose ester product if they were not removed completely from the product. It is also desirable to have the ability to control product DS and molecular weight by practical and predictable adjustments to process conditions.

SUMMARY OF THE INVENTION

This invention relates to preparation of cellulose esters (CEs) of degree of substitution (DS) less than or equal to 3.0 by reaction of cellulose in a carboxamide diluent or a urea-based diluent (optionally containing an additional cosolvent), with a acylating reagent such as carboxylic acid anhydride, using a titanium-containing species such as a titanate ester as catalyst.

More particularly, this invention relates to a process for preparing cellulose esters having a total DS/AGU of 0.1 to 3.0, said process comprising of contacting the following:
(i) a cellulose material,
(ii) a solubilizing amount of a solvent system comprising either a carboxamide diluent or a urea-based diluent, wherein the carboxamide portion of said carboxamide diluent comprises the structure:
$R^4R^5NCOCR^6R^7R^8$, wherein $R^4$, $R^5_1$, $R^6$, $R^7$, and $R^8$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms, and
wherein said urea portion of said urea-based diluent comprises the structure: $R^9R^{10}NCONR^{11}R^{12}$, wherein $R^9$, $R^{10}$, $R^{11}$, and $R^{12}$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms,
(iii) an acylating reagent selected from the group consisting of
(a) an acid chloride, and optionally, an acid acceptor,
(b) a carboxylic acid anhydride,
(c) diketene, ketene, 2,2,6-trimethyl-4H-1,3-dioxin-4-one, and an ester of acetoacetic acid,
(d) an ester of a carboxylic acid, and combinations of one or more of (a)–(d), and
(iv) a titanium-containing compound; wherein said components (i) and (ii) are contacted first and components (iii) and (iv) are contacted with the product of said contacting of components (i) and (ii), in any order.

Preferably, the invention relates to a process for making esters of cellulose with long-chain carboxylic acids (containing more than 4 carbon atoms).

The advantages of this process over the prior art include: being able to use cellulose with a lower alpha content and a lower molecular weight, synthesis of very high molecular weight cellulose esters, synthesis of partially or fully substituted esters of cellulose having a total D.S. of less than or equal to 3.0 with long-chain carboxylic acids and, optionally, short-chain acids, and partially substituted cellulose esters are obtained directly from the reaction mixture by standard isolation techniques. These partially substituted cellulose esters have good solubility in a wide range of organic solvents and can have high molecular weight. For the purposes of this invention, long-chain shall refer to greater than 4 carbons, while short-chain shall refer to 4 carbons or less.

The process of the invention has broad utility for the economical, direct synthesis of cellulose esters for plastics, film, fiber, and coatings applications.

DETAILED DESCRIPTION OF THE INVENTION

As used herein, the term "degree of substitution" or "DS" or "DS/AGU" refers to the average number of acyl substituents per anyhydroglucose ring of the cellulose polymer.

The present invention relates to a process for preparing a cellulose ester having a total DS/AGU of 0.1 to 3.0, preferably 2.0 to 3.0, more preferably 2.4 to 2.9, said process comprising of contacting the following:
(i) a cellulose material,
(ii) a solubilizing amount of a solvent system comprising either a carboxamide diluent or a urea-based diluent,
(iii) an acylating reagent selected from the group consisting of
(a) an acid chloride, and optionally, an acid acceptor,
(b) a carboxylic acid anhydride,
(c) diketene, ketene, 2,2,6-trimethyl-4H-1,3-dioxin-4-one, and an ester of acetoacetic acid,
(d) an ester of a carboxylic acid, and combinations one or more of (a)–(d), and
(iv) a titanium-containing compound.

Components (i) and (ii) are usually contacted first and components (iii) and (iv) are contacted with the product of said contacting of components (i) and (ii), in any order.

The cellulose esters produced by the invention generally comprise the following structure:

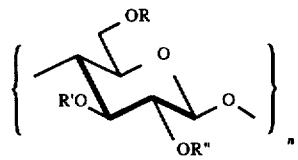

wherein R, R', and R'" are selected separately from the group consisting of: hydrogen, with the proviso that R, R', and R'" are not all hydrogen simultaneously; acetoacetyl; and $R^1C=O$ wherein $R^1$ is alkyl having from about 1 to about 30 carbons; carboxyalkyl of the structure $(CH_2)_mCO_2H$, where m is from 2 to 6, preferably from 2 to 4; carboxyalkenyl of the structure, $CR^2=CR^3CO_2H$, where $R^2$ and $R^3$ are independently selected from the group consisting of hydrogen, methyl, branched alkyl having from about 1 to about 30 carbons, phenyl and naphthyl; alkenyl having from about 1 to about 30 carbon atoms and from one to three double bonds; and branched alkenyl having from about 1 to about 30 carbon atoms and having from one to three double bonds.

For carboxyalkenyl, alkenyl and branched alkenyl, the double bonds present may be in the cis or trans position.

It is preferred that R, R' and R'" are independently selected from the group consisting of hydrogen, acetyl, propionyl and butyryl for the cellulose ester structure indicated above. The long-chain esters are also preferred.

The carboxamide portion of said carboxamide diluent comprises the structure: $R^4R^5NCOCR^6R^7R^8$, wherein $R^4$, $R^5$, $R^6$, $R^7$, and $R^8$ are independently selected from the group consisting of hydrogen, alkyl having from about 1 to about 20 carbon atoms, branched alkyl having from about 1 to about 20 carbon atoms, substituted phenyl, phenyl, substituted naphthyl, naphthyl, alkenyl having from about 1 to about 20 carbon atoms, and branched alkenyl having from about 1 to about 20 carbon atoms.

Examples of the carboxamide diluents are 1-methyl-2-pyrrolidinone (NMP), N,N-dimethylpropionamide, N,N-diethylacetamide, or N,N-dimethylacetamide (DMAC). DMAC is particularly preferred.

Carboxamides such as succinimides, phthalimides or glutarimides may also be used as diluents.

The urea portion of said urea-based diluent comprises the structure: $R^9R^{10}NCONR^{11}R^{12}$, wherein $R^9$, $R^{10}$, $R^{11}$, and $R^{12}$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms.

Urea compounds also intended within the scope of the general definition are ones wherein one of $R^9$ and $R^{10}$ and one of $R^{11}$ and $R^{12}$ are connected to form a cyclic urea, such as N,N-dimethylimidazolidinone. Preferred urea compounds are ones selected from the group consisting of urea and N,N-dimethylimidazolidinone. N,N-dimethylimidazolidinone has the structure:

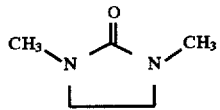

Amino acids such as proline or glycine may also be used as diluents.

The ratios of solvent to cellulose used can vary within a moderately wide range.

For the purposes of this invention, examples of alkyl having from about 1 to about 20 carbon atoms are methyl, ethyl, propyl, butyl, hexyl, nonyl, hexadecyl, and alkyl including aryl substituted alkyl such as benzyl, cycloalkyl such as cyclohexyl, etc. Examples of branched alkyl having from about 1 to about 20 carbon atoms are isopropyl, isobutyl, isononyl, tertiary butyl, etc. Examples of alkenyl are propenyl, decenyl, pentadecenyl, (Z)-heptadec-8-enyl, and (Z,Z)-heptadecadi-8,11-enyl. Examples of branched alkenyl are pentadecenyl.

Other activated acyl derivatives, such as acid chlorides, are also useful; in the case of acid chlorides an acid acceptor such as pyridine, sodium bicarbonate, or sodium acetate may optionally be used as well. The acylating reagents may also include diketene, 2,2,6-trimethyl-4H-1,3-dioxin-4-one (TKD), or an ester of acetoacetic acid. As taught by Witzeman in Tetrahedron Letters, 1990, 31, 1401–1404, tert-butyl acetoacetate (tBAA) is an especially suitable acetoacetate ester because it generates the reactive intermediate, acetylketene, at a high rate.

Preferred acid chlorides are acetyl chloride, propionyl chloride, butyryl chloride, hexanoyl chloride, lauroyl chloride, palmitoyl chloride, and stearoyl chloride. In the case of acid chlorides, an acid acceptor such as pyridine, sodium bicarbonate, or sodium acetate may optionally be used in combination with the acylating reagent.

Preferred in this invention are carboxylic anhydrides selected from the group consisting of acetic anhydride, propionic anhydride, butyric anhydride, hexanoic anhydride, nonanoic anhydride, lauric anhydride, palmitic anhydride, and stearic anhydride.

Preferred acylating reagents in this invention are esters of carboxylic acids which are selected from the group consisting of the following acids: capric, lauric, palmitic, stearic, oleic, linoleic, linolenic, cyclohexanedicarboxylic, benzoic, substituted benzoic, phthalic, isophthalic and terephthalic.

Acid acceptors useful within the context of this invention are selected from the group consisting of pyridine, triethylamine, sodium bicarbonate and sodium acetate. The term "acid acceptor" is generally meant refer to a basic material, such as a Lewis base. Pyridine is a preferred acid acceptor.

Preferred cellulose esters made by the process of this invention include cellulose acetate, cellulose butyrate, cellulose propionate, cellulose acetate butyrate, cellulose acetate propionate, cellulose acetate hexanoate, cellulose acetate nonanoate, cellulose acetate laurate, cellulose palmitate, cellulose acetate stearate, cellulose nonanoate, cellulose hexanoate, cellulose hexanoate propionate, and cellulose nonanoate propionate.

A wide variety of sources of cellulose may be used for the practice of this invention. Cellulose sources useful in our invention include hardwood pulp, softwood pulp, cotton linters, bacterial cellulose, and regenerated cellulose.

The practice of the current invention allows for a wide variety of cellulose starting materials, temperatures, concentrations, titanium-containing species, carboxylic acid anhydrides, nonsolvents, and reactant ratios. A wide variety of cellulose esters may be produced, depending on the conditions selected.

Temperatures employed for all aspects of the process of the invention are in the range of about 0° C. to about 200° C., preferably about 100° C. to about 180° C., and more preferably, about 120° C. to about 170° C.

The products are isolated by methods known in the art, for example by adding a nonsolvent (often water) to the reaction mixture, and isolating the precipitated product by filtration and washing.

In this invention, a combination of Ti compound/carboxamide or urea is employed wherein the carboxamide or urea functions as an activating agent, diluent, and a solvent.

In the synthesis process of the invention, the molar ratio of component (iii):component (iv) is that amount that will result in the desired DS/AGU under the chosen reaction conditions. Conditions suitable for the formation of cellulose esters can vary widely. The cellulose must first be activated by contacting with the amide diluent. This may be most simply accomplished by heating a slurry of the cellulose in the amide diluent to a temperature of 100°–180° C., although it is also possible to accomplish the activation by prolonged contact at room temperature.

The acylating reagent(s) is typically added all at once. The total amounts of acylating reagents used can vary from 3 to 10 equivalents based on equivalents of anhydroglucose units, with 4 to 6 equivalents most preferred. Within this total the proportion of each acylating reagent may be varied to achieve the desired DS of each substituent in the product.

It is preferable that the amount of cellulose material present is about 1.0 percent to about 50 percent, preferably about 9.0 percent to about 28 percent, based on the weight of said carboxamide, and the amount of said titanium-containing compound is about 0.1 percent to about 20 percent, preferably about 1.0 percent to about 10 percent, based on the weight of said cellulose material.

The process of this invention usually includes the additional step of insolubilizing the cellulose ester by addition of an insolubilizing amount of a nonsolvent. It may also include the step of separating the insolubilized cellulose ester.

Nonsolvents referred as being useful for the isolation of cellulose esters manufactured by this process will be specific to the particular material. They should dissolve the reaction solvents and any by-products, but should be nonsolvents for the cellulose ester. Examples include methanol, ethanol, 2-propanol, and water.

The titanium-containing species useful as catalysts for this process are titanium (IV) compounds. They may be titanic acid, titanate esters, tetra(amino)titanium compounds, or titanium (IV) compounds with a mixture of these substituents. Examples include tetra(2-propyl)titanate, titanic acid, tetra(1-propyl)titanate, tetra(1-butyl)titanate, and tetrakis(dimethylamino)titanium.

The products of the process of this invention are useful for various purposes such as for plastics, film, fiber, and coatings applications.

For the cellulose esters of this invention, DS or DS/AGU may be determined by any method known in the art, for example, by proton NMR.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise described. All percentages are by weight unless otherwise described.

EXAMPLES

In the following examples, the cellulose and DMAC solvent were added to a three-neck round bottom flask equipped with mechanical stirrer, thermometer, and nitrogen inlet. The slurry was heated to 100° C. under nitrogen, with stirring. Then the anhydride(s) and the catalyst were added to the activated cellulose, and the mixture was heated to reaction temperature. Note that "equiv" below refers to equivalents of reagent per anhydroglucose unit of cellulose. With the noted exceptions, the mixture was stirred at the reaction temperature until it was clear and smooth. The solution then was cooled to 20°–80° C. The reaction mixture was in some cases filtered to remove a few short, residual fibers (sometimes the reaction mixture was diluted with acetone or the amide diluent first to reduce viscosity). The product was precipitated by adding the filtrate dropwise to a nonsolvent with strong agitation. The product was isolated by filtration, then was slurried again in a nonsolvent. This process was repeated two to five times as required to remove all impurities from the product. When nonaqueous nonsolvents were used, the slurry and filtration processes were repeated twice more with water as the nonsolvent in order to prevent plasticization and flow of the product during drying. The product was dried in a vacuum oven under nitrogen at 40°–80° C. The yields quoted in the examples are of isolated, well-characterized products. DS was determined by $^1$H NMR in d-6 DMSO or $CDCl_3$ containing several drops of trifluoroacetic acid (to shift any hydroxyl protons downfield), or by hydrolysis of a sample of the cellulose ester followed by quantification of liberated carboxylic acids by gas chromatography. Gel permeation chromatography used NMP as solvent (polystyrene reference or absolute by GPC-V). Intrinsic viscosity was measured in NMP or DMSO (dimethylsulfoxide) solution. Differential scanning calorimetry (20° C./min, second scan, maximum temperature 240° C.) was employed to determine thermal transitions. Titanium content was measured by ion cyclotron phosphorescence (ICP). Representative members of each family of materials were examined by infrared spectroscopy to confirm product identity. All temperatures in degrees centigrade.

Example 1

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX (hardwood cellulose pulp, available from International Paper in Natchez, Mississippi) |
| Carboxylic Anhydride | Acetic anhydride |
| Equivalents | 6 |
| Reaction Temperature | 120° C. |
| Amide Diluent | DMAC |
| g Amide/g Cellulose | 10 |
| Catalyst | Tetra(2-propyl)titanate |
| Equivalents | 0.0171 |
| Reaction Time | 4.3 hours |
| Key Analysis | DS(acetyl) = 2.63, IV = 3.40, GPC $M_n$ = 107,000, soluble in $CHCl_3$, acetone, acetic acid, DMSO and NMP, titanium content = 290 ppm. |

This example demonstrates direct synthesis from cellulose of a partially substituted, high molecular weight cellulose acetate with good solubility in organic solvents.

Example 2

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Propionic anhydride |
| Equivalents | 4.5 |
| Reaction Temperature | 140° C. |
| Amide Diluent | DMAC |
| g Amide/g Cellulose | 7 |
| Catalyst | Tetra(2-propyl)titanate |
| Equivalents | 0.0171 |
| Reaction Time | 8.5 hours |
| Key Analyses | DS(propionyl) = 2.46, |

-continued

DS(acetyl) = 0.11, IV =
1.69, GPC $M_n$ = 65,900, Tg =
156° C., $T_m$ = 231° C.,
soluble in acetone, THF,
acetic acid, $CHCl_3$, DMSO
and NMP, Ti content = 1630
ppm.

This example demonstrates synthesis of a semicrystalline, relatively high molecular weight, partially substituted cellulose acetate propionate with good solubility in organic solvents, directly from cellulose.

Example 3

Reagents set forth below were subjected to the standard procedure described above under the standard reaction conditions, except as described below. The results, in terms of identity of the desired cellulose ester, and key analyses of the product, are also set forth below.

| Cellulose | Natchez HVX |
|---|---|
| Carboxylic Anhydride | Acetic anhydride |
| Equivalents | 6.00 |
| Reaction Temperature | 120° C. |
| Amide Diluent | 1-Methyl-2-pyrrolidinone (NMP) |
| g Amide/g Cellulose | 10 |
| Catalyst | Tetra(2-propyl)titanate |
| Equivalents | 0.0171 |
| Reaction Time | 7.7 hours |
| Key Analyses | DS(acetyl) = 2.52, IV; solution too thick to measure, GPC $M_n$ = 134,000, Tg = 201° C., soluble in acetic acid, DMSO and NMP. |

This example demonstrates that NMP is also a useful solvent for the reaction, that the product therefrom has high molecular weight, is less soluble than that from DMAC, and possesses high solution viscosity, and that the reaction is slower in NMP than in DMAC.

Example 4

Reagents set forth below were subjected to the standard procedure described above under the standard reaction conditions, except as described below. The results, in terms of identity of the desired cellulose ester, and key analyses of the product, are also set forth below.

| Cellulose | Natchez HVX |
|---|---|
| Carboxylic Anhydride | Acetic anhydride |
| Equivalents | 6.00 |
| Reaction Temperature | 120° C. |
| Amide Diluent | N,N-Dimethylformamide |
| g Amide/g Cellulose | 10 |
| Catalyst | Tetra(2-propyl)titanate |
| Equivalents | 0.0171 |
| Reaction Time | 12.8 hours |
| Key Analyses | DS(acetyl) = 2.42, IV = 0.95, GPC $M_n$ = 64,900, partly soluble in DMSO and mostly soluble in NMP, Tg = 194° C. |

This example demonstrates that when DMF (N,N-dimethylformamide) is used as amide diluent, the reaction is very slow, and a cellulose acetate product of poor solubility is obtained.

Example 5

Reagents set forth below were subjected to the standard procedure described above under the standard reaction conditions, except as described below. The results, in terms of identity of the desired cellulose ester, and key analyses of the product, are also set forth below.

| Cellulose | Viscocell (hardwood cellulose pulp available from International Paper in Natchez, Mississippi) |
|---|---|
| Carboxylic Anhydride | Propionic anhydride |
| Equivalents | 6.00 |
| Reaction Temperature | 140° C. |
| Amide Diluent | N,N-Dimethylpropionamide |
| g Amide/g Cellulose | 10 |
| Catalyst | Tetra(2-propyl)titanate |
| Equivalents | 0.0171 |
| Reaction Time | 8.6 hours |
| Key Analyses | DS(propionyl) = 2.71, DS(acetyl) = 0.0, IV = 0.94, GPC $M_n$ = 40,100, Tg = 137° C., soluble in acetone, acetic acid, THF, $CHCl_3$, DMSO and NMP. |

This example demonstrates that N,N-dimethylpropionamide is a suitable solvent for the propionylation of cellulose using Ti catalyst to obtain a partially substituted cellulose propionate. It also demonstrates that the acetyl in CAPs (cellulose acetate propionates) made by this method except with DMAC as diluent originates from the acyl of the DMAC.

Example 6

Reagents set forth below were subjected to the standard procedure described above under the standard reaction conditions, except as described below. The results, in terms of identity of the desired cellulose ester, and key analyses of the product, are also set forth below.

| Cellulose | Natchez HVX |
|---|---|
| Carboxylic Anhydride | Propionic anhydride |
| Equivalents | 4.50 |
| Reaction Temperature | 120° C. |
| Amide Diluent | DMAC |
| g Amide/g Cellulose | 5 |
| Catalyst | Tetra(2-propyl)titanate |
| Equivalents | 0.0171 |
| Reaction Time | 17.3 hours |
| Key Analyses | DS(propionyl) = 2.57, DS(acetyl) = 0.08, IV = 1.80, GPC $M_n$ = 80,700, Tg = 152° C., $T_m$ = 229° C., soluble in acetone, acetic acid, THF, $CHCl_3$, DMSO and NMP. |

This example demonstrates that in DMAC at lower temperature and higher concentration, in comparison to Example 2, a cellulose propionate product of higher molecular weight is obtained but with a longer reaction time.

Example 7

Reagents set forth below were subjected to the standard procedure described above under the standard reaction conditions, except as described below. The results, in terms of identity of the desired cellulose ester, and key analyses of the product, are also set forth below.

| Cellulose | Natchez HVX |
|---|---|
| Carboxylic Anhydride | Propionic anhydride |

| | |
|---|---|
| Equivalents | 4.50 |
| Reaction Temperature | 120° C. |
| Carboxylic Acid | Propionic Acid |
| g Carboxylic Acid/ g Cellulose | 2.18 |
| Amide Diluent | DMAC |
| g Amide/g Cellulose | 2.62 |
| Catalyst | Tetra(2-propyl)titanate |
| Equivalents | 0.0171 |
| Reaction Time | 28.9 hours |
| Key Analyses | DS(propionyl) = 2.65, DS(acetyl) = 0.23, IV = 0.92, GPC $M_n$ = 43,000, Tg = 128° C., $T_m$ = 206° C., soluble in acetone, acetic acid, THF, CHCl$_3$, DMSO and NMP. |

This example demonstrates that when a combined diluent of amide (DMAC) and carboxylic acid is used, esterification is much slower (compare to example 6) and the product CAP has lower molecular weight.

Example 8

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Hexanoic anhydride |
| Equivalents | 2.00 |
| Carboxylic Anhydride 2 | Acetic anhydride |
| Equivalents | 2.00 |
| Reaction Temperature | 140° C. |
| Amide Diluent | DMAC |
| g Amide/g Cellulose | 7 |
| Catalyst | Tetra(2-propyl)titanate |
| Equivalents | 0.0171 |
| Reaction Time | 9.2 hours |
| Key Analyses | DS(hexanoyl) = 0.75, DS(acetyl) = 1.91, IV = 1.39, GPC $M_n$ = 86,500, Tg = 149° C. |

This example demonstrates that it is possible to synthesize directly a partially-substituted mixed ester containing long chain ester groups such as hexanoyl by using a Ti catalyst in an amide diluent.

Example 9

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Acetic anhydride |
| Equivalents | 2.0 |
| Carboxylic Anhydride 2 | Hexanoic anhydride |
| Equivalents | 2.0 |
| Reaction Temperature | 140° C. |
| Amide Diluent | DMAC |
| g Amide/g Cellulose | 7 |
| Catalyst | Tetra(2-propyl)titanate |
| Equivalents | 0.0285 |
| Reaction Time | 9.0 hours |
| Key Analyses | DS(acetyl) = 1.84, DS(hexanoyl) = 0.73, IV = 1.40, GPC $M_n$ = 32,900, soluble in acetone, acetic acid, THF, CHCl$_3$, DMSO and NMP, Tg = 153° C. |

This example demonstrates direct synthesis from cellulose of a partially substituted, high molecular weight mixed cellulose ester, where one of the ester groups is a long-chain ester, with good solubility in organic solvents.

Example 10

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Hexanoic anhydride |
| Equivalents | 4.50 |
| Reaction Temperature | 155° C. |
| Amide Diluent | DMAC |
| g Amide/g Cellulose | 7.00 |
| Catalyst | Tetra(2-propyl)titanate |
| Equivalents | 0.0171 |
| Reaction Time | 5.7 hours |
| Key Analyses | DS(acetyl) = 0.12, DS(hexanoyl) = 2.39, IV = 0.94, GPC $M_n$ = 32,700, Tg = 119° C., titanium content 1850 ppm. |

This example demonstrates direct synthesis from cellulose of a partially substituted, mixed cellulose ester, where one of the ester groups is from a long-chain carboxylic acid, by reaction with only the anhydride of the long-chain acid in DMAC diluent with Ti catalysis.

Example 11

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Acetic anhydride |
| Equivalents | 2.0 |
| Carboxylic Anhydride 2 | Nonanoic anhydride |
| Equivalents | 2.0 |
| Reaction Temperature | 150° C. |
| Amide Diluent | DMAC |
| g Amide/g Cellulose | 7 |
| Catalyst | Tetra(2-propyl)titanate |
| Equivalents | 0.0171 |
| Reaction Time | 7.9 hours |
| Key Analyses | DS(acetyl) = 2.03, DS(nonanoyl) = 0.70, IV = 1.18, GPC $M_n$ = 44,500, soluble in acetone, acetic acid, THF, CHCl$_3$, DMSO and NMP, Tg = 128° C. |

This example demonstrates direct synthesis from cellulose of a partially substituted, mixed cellulose ester, where one of the ester groups is a long-chain ester, with good solubility in organic solvents.

Example 12

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Acetic anhydride |
| Equivalents | 2.0 |
| Carboxylic Anhydride 2 | Lauric anhydride |
| Equivalents | 2.0 |
| Reaction Temperature | 150° C. |
| Amide Diluent | DMAC |
| g Amide/g Cellulose | 5 |
| Catalyst | Tetra(2-propyl)titanate |
| Equivalents | 0.0342 |
| Reaction Time | 3.67 hours |
| Key Analyses | DS(acetyl) = 2.09, DS(lauroyl) = 0.81, IV = 1.32, GPC $M_n$ = 54,900, soluble in acetone, acetic acid, THF, CHCl$_3$, DMSO and NMP, Tg = 122° C. |

This example demonstrates direct synthesis from cellulose of a partially substituted, mixed cellulose ester, where one of the ester groups is a long-chain ester, with good solubility in organic solvents.

Example 13

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Acetic anhydride |
| Equivalents | 2.0 |
| Carboxylic Anhydride 2 | Palmitic anhydride |
| Equivalents | 2.0 |
| Reaction Temperature | 145° C. |
| Amide Diluent | DMAC |
| g Amide/g Cellulose | 20 |
| Catalyst | Tetra(2-propyl)titanate |
| Equivalents | 0.0171 |
| Reaction Time | 5.8 hours |
| Key Analyses | DS(acetyl) = 2.06, DS(palmitoyl) = 0.42, IV = 0.29, GPC $M_n$ = 33,400, soluble in acetone, acetic acid, THF, CHCl$_3$, DMSO and NMP, Tg = 156° C. |

This example demonstrates direct synthesis from cellulose of a partially substituted, mixed cellulose ester, where one of the ester groups is a long-chain ester, with good solubility in organic solvents.

Example 14

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Acetic anhydride |
| Equivalents | 2.0 |
| Carboxylic Anhydride 2 | Hexanoid anhydride |
| Equivalents | 2.0 |
| Reaction Temperature | 140° C. |
| Amide Diluent | DMAC |
| g Amide/g Cellulose | 7.67 |
| Catalyst | Tetrakis(diethylamino)titanium (IV) |
| Equivalents | 0.0171 |
| Reaction Time | 16.8 hours |
| Key Analyses | DS(acetyl) = 1.91, DS(hexanoyl) = 0.83, IV = 1.49, GPC $M_n$ = 40,700, soluble in acetone, acetic acid, THF, CHCl$_3$, DMSO, ethyl acetate, n-butyl acetate and NMP, Tg = 142° C. |

This example demonstrates direct synthesis from cellulose of a partially substituted, mixed cellulose ester, where one of the ester groups is a long-chain ester, by use of an aminotitanium compound as catalyst.

Example 15

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride 1 | Acetic anhydride |
| Equivalents | 2.0 |
| Carboxylic Anhydride 2 | Hexanoic anhydride |
| Equivalents | 2.0 |
| Reaction Temperature | 155° C. |
| Amide Diluent | DMAC |
| g Amide/g Cellulose | 7.67 |
| Catalyst | Tetra(1-propyl)titanate |
| Equivalents | 0.0171 |
| Reaction Time | 7.7 hours |
| Key Analyses | DS(acetyl) = 1.84, DS(hexanoyl) = 0.79, IV = 1.41, GPC $M_n$ = 30,600, soluble in acetone, acetic acid, and NMP, Tg = 147° C. |

This example demonstrates direct synthesis from cellulose of a partially substituted, mixed cellulose ester, where one of the ester groups is a long-chain ester, by use of an n-alkyl titanate compound as catalyst.

Example 16

Comparative Study

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Acetic anhydride |
| Equivalents | 6.0 |
| Reaction Temperature | 120–140° C. |

-continued

| | |
|---|---|
| Amide Diluent | DMAC |
| g Amide/g Cellulose | 10.0 |
| Catalyst | Zinc (II) Acetate |
| Equivalents | 0.0171 |
| Reaction Time | 15.0 hours |
| Results | No reaction was observed over the course of 15 hours, starting at 120° C. and increasing to 140° C. after 5 hours. |

This example demonstrates that Lewis acids based on zinc do not catalyze cellulose esterification at useful reaction rates in amide diluents.

Example 17

Comparative Study

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Acetic anhydride |
| Equivalents | 6.0 |
| Reaction Temperature | 120–150° C. |
| Amide Diluent | DMAC |
| g Amide/g Cellulose | 7.67 |
| Catalyst | Antimony (III) Ethoxide |
| Equivalents | 0.0171 |
| Reaction Time | 11.6 hours |
| Results | No reaction was observed over the course of 11.6 hours, starting at 120° C. and increasing to 140° C. after 1.3 hours, then increasing to 150° C. after 6 hours. |

This example demonstrates that Lewis acids based on antimony do not catalyze cellulose esterification at useful reaction rates in amide diluents.

Example 18

Comparative Study

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Acetic anhydride |
| Equivalents | 6.0 |
| Reaction Temperature | 120–145° C. |
| Amide Diluent | DMAC |
| g Amide/g Cellulose | 5.0 |
| Catalyst | Germanium (IV) Oxide |
| Equivalents | 0.0171 |
| Reaction Time | 6.2 hours |
| Results | No reaction was observed over the course of 6.2 hours, starting at 120° C. and increasing to 145° C. after 2 hours. |

This example demonstrates that Lewis acids based on germanium do not catalyze cellulose esterification at useful reaction rates in amide diluents.

Example 19

Comparative Study

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Acetic anhydride |
| Equivalents | 6.0 |
| Reaction Temperature | 140–174° C. |
| Amide Diluent | DMAC |
| g Amide/g Cellulose | 10.0 |
| Catalyst | Manganese (II) Acetate |
| Equivalents | 0.0171 |
| Reaction Time | 4.0 hours |
| Results | No reaction was observed over the course of 4.0 hours, starting at 140° C. and increasing to 174° C. after 1.2 hours. |

This example demonstrates that Lewis acids based on manganese do not catalyze cellulose esterification at useful reaction rates in amide diluents.

Example 20

Reagents set forth below were subjected to the standard procedure described above under the standard reaction conditions, except as described below. The results, in terms of identity of the desired cellulose ester, and key analyses of the product, are also set forth below.

| | |
|---|---|
| Cellulose | Natchez HVX |
| Carboxylic Anhydride | Acetic anhydride |
| Equivalents | 6.0 |
| Reaction Temperature | 120° C. |
| Urea Diluent | N,N-Dimethylimidazolidinone |
| g Urea/g Cellulose | 7.67 |
| Catalyst | Tetra(2-propyl)titanate |
| Equivalents | 0.0171 |
| Reaction Time | 6.5 hours |
| Key Analyses | DS(acetyl) = 2.62, IV = 2.60; GPC $M_n$ = 50,000, $T_g$ = 193° C., titanium content 449 ppm. |

This example demonstrates that urea diluents are also useful for direct synthesis from cellulose of a partially substituted, high molecular weight cellulose ester by use of an alkyl titanate compound as catalyst.

Example 21

Reagents set forth below were subjected to the standard procedure described above under the standard reaction conditions, except as described below. The results, in terms of identity of the desired cellulose ester, and key analyses of the product, are also set forth below.

| Cellulose | Placetate, a softwood pulp commercially available from Rayonier |
|---|---|
| Carboxylic Anhydride | Propionic anhydride |
| Equivalents | 4.5 |
| Reaction Temperature | 150° C. |
| Amide Diluent | DMAC |
| g Amide/g Cellulose | 10.0 |
| Catalyst | Tetra(2-propyl)titanate |
| Equivalents | 0.0171 |
| Reaction Time | 11.7 hours |
| Key Analyses | DS(acetyl) = 0.25, IV = 1.64, GPC $M_n$ = 36,200, $T_g$ = 147° C., $T_m$ = 228° C. |

This example demonstrates direct synthesis from a high DP(degree of polymerization), softwood pulp cellulose of a partially substituted, high molecular weight cellulose acetate propionate by use of an alkyl titanate compound as catalyst.

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinenet to the practice of this invention.

We claim:

1. A process for preparing cellulose esters having a total DS/AGU of 0.1 to 3.0, said process comprising contacting the following:
   (i) a cellulose material,
   (ii) a solubilizing amount of a solvent system for said resultant cellulose esters comprising either a carboxamide diluent or a urea-based diluent,
   wherein the carboxamide portion of said carboxamide diluent comprises the structure: $R^4R^5NCOCR^6R^7R^8$, wherein $R^4$, $R^5$, $R^6$, $R^7$, and $R^8$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms, and
   wherein said urea portion of said urea-based diluent comprises the structure: $R^9R^{10}NCONR^{11}R^{12}$, wherein $R^9$, $R^{10}$, $R^{11}$, and $R^{12}$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms,
   (iii) an acylating reagent selected from the group consisting of
      (a) an acid chloride, and optionally, an acid acceptor,
      (b) a carboxylic acid anhydride,
      (c) any one of diketene, ketene, 2,2,6-trimethyl-4H-1,3-dioxin-4-one, and an ester of acetoacetic acid,
      (d) an ester of a carboxylic acid, and combinations of one or more of (a)–(d), and
   (iv) a titanium-containing compound;
wherein said components (i) and (ii) are contacted first and components (iii) and (iv) are contacted with the product of said contacting of components (i) and (ii), in any order.

2. The process of claim 1, wherein after said contacting, the resultant esterified cellulose is a partially esterified cellulose having a total DS/AGU of less than 3.0 and the partially esterified cellulose is not hydrolysed during said contacting or in a subsequent step.

3. The process of claim 1, wherein the solvent system does not contain lithium chloride.

4. A process for preparing cellulose esters having a total DS/AGU of 0.1 to 3.0, said process comprising contacting the following:
   (i) a cellulose material,
   (ii) a solubilizing amount of a solvent system for said resultant cellulose esters comprising a carboxamide diluent,
   wherein the carboxamide of said carboxamide diluent has the structure: $R^4R^5NCOCR^6R^7R^8$, wherein $R^4$, $R^5$, $R^6$, $R^7$ and $R^8$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms,
   (iii) an acylating reagent selected from the group consisting of
      (a) an acid chloride, and optionally, an acid acceptor,
      (b) a carboxylic acid anhydride,
      (c) any of one of diketene, ketene, 2,2,6-trimethyl-4H-1,3-dioxin-4-one, an ester of acetoacetic acid,
      (d) an ester of a carboxylic acid, and combinations of one or more of (a)–(d), and
   (iv) a titanium-containing compound;
wherein said components (i) and (ii) are contacted first and components (iii) and (iv) are contacted with the product of said contacting of components (i) and (ii), in any order.

5. The process of claim 4, wherein after said contacting, the resultant esterified cellulose is a partially esterified cellulose having a total DS/AGU of less than 3.0 and the partially esterified cellulose is not hydrolysed during said contacting or in a subsequent step.

6. The process of claim 4, wherein the solvent system does not contain lithium chloride.

7. The process of claim 4 wherein said cellulose esters comprise the structure:

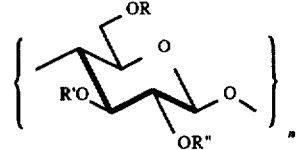

wherein R, R', and R'" are selected separately from the group consisting of: hydrogen, with the proviso that R, R', and R'" are not all hydrogen simultaneously; acetoacetyl; and $R^1C=O$ wherein $R^1$ is selected from the group consisting of: alkyl having from about 1 to about 30 carbons; carboxyalkyl of the structure $(CH_2)_mCO_2H$, where M is from 2 to 6; carboxyalkenyl of the structure, $CR^2=CR^3CO_2H$, where $R^2$ and $R^3$ are independently selected from the group consisting of hydrogen, methyl, branched alkyl having from about 1 to about 30 carbons, phenyl, and naphthyl; alkenyl having from about 1 to about 30 carbon atoms and from one to three double bonds; and branched alkenyl having from about 1 to about 30 carbon atoms and having from one to three double bonds.

8. The process of claim 7 wherein said m of said carboxyalkyl is from 2 to 4.

9. The process of claim 7 wherein R, R', and R'" are independently selected from hydrogen, acetyl, propionyl and butyryl.

10. The process of claim 4 wherein the amount of cellulose material is about 1.0 percent to about 50 percent, based on the weight of said carboxamide, and the amount of said titanium-containing compound is about 0.1 percent to about 20 percent, based on the weight of said cellulose material.

11. The process of claim 4 wherein the amount of cellulose material is about 9 percent to about 28 percent, based on the weight of said carboxamide, and the amount of said titanium-containing compound is about 1.0 percent to about 10 percent, based on the weight of said cellulose material.

12. The process of claim 4 wherein the total DS/AGU of the cellulose ester is about 2.0 to about 3.0.

13. The process of claim 4 wherein the total DS/AGU of the cellulose ester is about 2.4 to about 2.9.

14. The process of claim 4 wherein said carboxamide diluent is selected from the group consisting of 1-methyl-2-pyrrolidinone, N,N-dimethylpropionamide, N,N-diethylacetamide and N,N-dimethylacetamide.

15. The process of claim 4 wherein said carboxamides are selected from the group consisting of succinimides, phthalimides and glutarimides.

16. The process of claim 4 wherein said ester of acetoacetic acid is tert-butyl acetoacetate.

17. The process of claim 4 wherein said carboxylic anhydride is selected from the group consisting of acetic anhydride, propionic anhydride, butyric anhydride, hexanoic anhydride, nonanoic anhydride, lauric anhydride, palmitic anhydride, and stearic anhydride.

18. The process of claim 4 wherein said esters of carboxylic acids are esters formed from the group consisting of the following acids: capric, lauric, palmitic, stearic, oleic, linoleic, linolenic, cyclohexanedicarboxylic, benzoic, substituted benzoic, phthalic, isophthalic and terephthalic.

19. The process of claim 4 wherein said acid chloride is selected from the group consisting of acetyl chloride, propionyl chloride, butyryl chloride, hexanoyl chloride, lauroyl chloride, stearoyl chloride.

20. The process of claim 4 wherein said acid acceptor is selected from the group consisting of pyridine, triethylamine, sodium bicarbonate and sodium acetate.

21. The process of claim 4 wherein said acid acceptor is pyridine.

22. The process of claim 4 wherein said titanium-containing compounds are titanium (IV) compounds selected from the group consisting of titanic acid, titanate esters, tetra(amino)titanium compounds or mixtures thereof.

23. The process of claim 4 wherein said titanium-containing compounds are selected from the group consisting of tetra(2-propyl)titanate, titanic acid, tetra(1-propyl) titanate, tetra(1-butyl)titanate, and tetrakis(dimethylamino) titanium.

24. The process of claim 4 wherein said cellulose material is selected from the group consisting of hardwood pulp, softwood pulp, cotton linters, bacterial cellulose, and regenerated cellulose.

25. The process of claim 4 carried out at a temperature between about 0° C. and about 200° C.

26. The process of claim 4 carried out at a temperature between about 100° C. and about 180° C.

27. The process of claim 4 carried out at a temperature between about 120° C. and about 170° C.

28. The process of claim 4 including the additional step of insolubilizing the cellulose ester by addition of an insolubilizing amount of a nonsolvent.

29. The process of claim 28 further comprises separating the insolubilized cellulose ester.

30. The process of claim 29 wherein said nonsolvent is methanol, ethanol, propanol, water, or a mixture thereof.

31. A process for preparing cellulose esters having a total DS/AGU of 0.1 to 3.0, said process comprising contacting the following:

(i) a cellulose material, (ii) a solubilizing amount of a solvent system for said resultant cellulose esters comprising a urea-based diluent, wherein said urea-based compound of said urea-based diluent has the structure: $R^9R^{10}NCONR^{11}R^{12}$, wherein $R^9$, $R^{10}$, $R^{11}$, and $R^{12}$ are independently selected from the group consisting of hydrogen, alkyl having from about 1 to about 20 carbon atoms, branched alkyl having from about 1 to about 20 carbon atoms, phenyl, naphthyl, alkenyl having from about 1 to about 20 carbon atoms, and branched alkenyl having from about 1 to about 20 carbon atoms, (iii) an acylating reagent selected from the group consisting of
(a) an acid chloride, and optionally, an acid acceptor,
(b) a carboxylic acid anhydride,
(c) any one of diketene, ketene, 2,2,6-trimethyl-4H-1,3-dioxin-4-one, and an ester of acetoacetic acid,
(d) an ester of a carboxylic acid, and combinations of one or more of (a)-(d), and (iv) a titanium-containing compound;

wherein said components (i) and (ii) are contacted first and components (iii) and (iv) are contacted with the product of said contacting of components (i) and (ii), in any order.

32. The process of claim 31, wherein after said contacting, the resultant esterified cellulose is a partially esterified cellulose having a total DS/AGU of less than 3.0 and the partially esterified cellulose is not hydrolysed during said contacting or in a subsequent step.

33. The process of claim 31, wherein the solvent system does not contain lithium chloride.

34. The method of claim 31 wherein said cellulose esters comprise the structure:

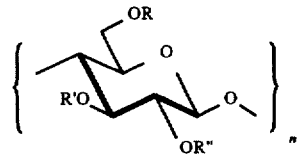

wherein R, R', and R'" are selected separately from the group consisting of: hydrogen, with the proviso that R, R', and R'" are not all hydrogen simultaneously; acetoacetyl; and $R^1C=O$ wherein $R^1$ is selected from the group consisting of alkyl having from about 1 to about 30 carbons; carboxyalkyl of the structure $(CH_2)_mCO_2H$, where m is from about 2 to 6; carboxyalkenyl of the structure $CR^2=CR^3CO_2H$, where $R^2$ and $R^3$ are independently selected from the group consisting of hydrogen or methyl, branched alkyl having from about 1 to about 30 carbons, phenyl and naphthyl; alkenyl having from about 1 to about 30 carbon atoms and having from one to three double bonds; and branched alkenyl having from about 1 to about 30 carbon atoms and having from one to three double bonds.

35. The process of claim 34 wherein said m of said carboxyalkyl is from 2 to 4.

36. The process of claim 34 wherein one of $R^9$ and $R^{10}$ and one of $R^{11}$ and $R^{12}$ are connected to form a cyclic urea.

37. The process of claim 35 wherein R, R', and R'" are independently selected from hydrogen, acetyl, propionyl and butyryl.

38. The process of claim 34 wherein the amount of cellulose material is about 1.0 percent to about 50 percent, based on the weight of said urea-based compound, and the amount of said titanium-containing compound is about 0.1 percent to about 20 percent, based on the weight of said cellulose material.

39. The process of claim 34 wherein the amount of cellulose material is about 9 percent to about 28 percent, based on the weight of said urea-based compound, and the amount of said titanium-containing compound is about 1.0 percent to about 10 percent, based on the weight of said cellulose material.

40. The process of claim 34 wherein the total DS/AGU of the cellulose ester is about 2.0 to about 3.0.

41. The process of claim 34 wherein the total DS/AGU of the cellulose ester is about 2.4 to about 2.9.

42. The process of claim 34 wherein said urea-based compound is selected from the group consisting of urea and N,N-dimethylimidazolidinone.

43. The process of claim 34 wherein said ester of acetoacetic acid is tert-butyl acetoacetate.

44. The process of claim 34 wherein said carboxylic anhydride is selected from the group consisting of acetic anhydride, propionic anhydride, butyric anhydride, hexanoic anhydride, nonanoic, lauric, palmitic, and stearic.

45. The process of claim 34 wherein said esters of carboxylic acids are selected from the group consisting of the following acids: capric, lauric, palmitic, stearic, oleic, linoleic, linolenic, cyclohexanedicarboxylic, benzoic, substituted benzoic, phthalic, isophthalic and terephthalic.

46. The process of claim 34 wherein said acid chloride is selected from the group consisting of acetyl chloride, propionyl chloride, butyryl chloride, hexanoyl chloride, lauroyl chloride and stearoyl chloride.

47. The process of claim 34 wherein said acid acceptor is selected from the group consisting of pyridine, triethylamine, sodium bicarbonate and sodium acetate.

48. The process of claim 34 wherein said acid acceptor is pyridine.

49. The process of claim 34 wherein said titanium-containing compounds are titanium (IV) compounds selected from the group consisting of titanic acid, titanate esters, tetra(amino)titanium compounds or mixtures thereof.

50. The process of claim 34 wherein said titanium-containing compounds are selected from the group consisting of tetra(2-propyl)titanate, titanic acid, tetra(1-propyl) titanate, tetra(1-butyl)titanate, and tetrakis(dimethylamino) titanium.

51. The process of claim 34 wherein said cellulose material is selected from the group consisting of hardwood pulp, softwood pulp, cotton linters, bacterial cellulose, and regenerated cellulose.

52. The process of claim 34 carried out at a temperature between about 0° C. and about 200° C.

53. The process of claim 34 carried out at a temperature between about 100° C. and about 180° C.

54. The process of claim 34 carried out at a temperature between about 120° C. and about 170° C.

55. The process of claim 34 including the additional step of insolubilizing the cellulose ester by addition of an insolubilizing amount of a nonsolvent.

56. The process of claim 55 further comprising separating the insolubilized cellulose ester.

57. The process of claim 55 wherein said nonsolvent is methanol, ethanol, propanol, water, or a mixture thereof.

\* \* \* \* \*

UNITED STATES PATENT AND TRADEMARK OFFICE
CERTIFICATE OF CORRECTION

PATENT NO. : 5,750,677
DATED : May 12, 1998
INVENTOR(S) : Edgar et al

It is certified that error appears in the above-identified patent and that said Letters Patent is hereby corrected as shown below:

Column 18, line 57, (Claim 7) reads as follows:

"alkyl of the structure $(CH_2)_m CO_2 H$, where M is from 2 to 6;"

but should read as follows:

"alkyl of the structure $(CH_2)_m CO_2 H$, where $m$ is from 2 to 6;"

Signed and Sealed this

Ninth Day of February, 1999

Attest:

*Attesting Officer*

*Acting Commissioner of Patents and Trademarks*